(12) United States Patent
Golgiri et al.

(10) Patent No.: US 10,412,546 B2
(45) Date of Patent: Sep. 10, 2019

(54) METHOD AND APPARATUS FOR PHONE AS A KEY INCLUDING DYNAMIC WIRELESS BAND SWITCHING

(71) Applicant: FORD GLOBAL TECHNOLOGIES, LLC, Dearborn, MI (US)

(72) Inventors: Hamid M. Golgiri, Dearborn, MI (US); Vivekanandh Elangovan, Canton, MI (US); Aaron Matthew DeLong, Toledo, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 5 days.

(21) Appl. No.: 15/869,293

(22) Filed: Jan. 12, 2018

(65) Prior Publication Data

US 2019/0222958 A1    Jul. 18, 2019

(51) Int. Cl.
| | |
|---|---|
| H04W 4/02 | (2018.01) |
| H04W 72/04 | (2009.01) |
| H04B 7/0426 | (2017.01) |
| H04B 7/0413 | (2017.01) |
| H04B 7/0417 | (2017.01) |
| H04W 4/70 | (2018.01) |
| H04W 84/06 | (2009.01) |
| H04W 4/40 | (2018.01) |
| H04B 7/185 | (2006.01) |

(Continued)

(52) U.S. Cl.
CPC ............ *H04W 4/023* (2013.01); *H04B 7/043* (2013.01); *H04B 7/0413* (2013.01); *H04B 7/0417* (2013.01); *H04B 7/18506* (2013.01); *H04W 4/40* (2018.02); *H04W 4/70* (2018.02); *H04W 72/0453* (2013.01); *H04W 84/06* (2013.01); *B64C 39/024* (2013.01); *H04B 7/0452* (2013.01); *H04W 4/80* (2018.02); *H04W 76/10* (2018.02)

(58) Field of Classification Search
CPC ...... B60R 2001/1223; B60R 25/02128; B60R 25/241; B60R 1/02; B60R 2325/20; B60R 25/04; B60R 25/1003; B60R 25/102; B60R 25/209; B60R 25/252; B60R 25/302; H04W 12/08; H04W 12/04; H04W 4/02; H04W 4/80; H04W 12/06; H04W 64/006; H04W 88/06; H04W 4/046; H04W 52/0245; H04W 72/085
See application file for complete search history.

(56) References Cited

U.S. PATENT DOCUMENTS

2016/0149878 A1 *  5/2016  Pogorelik ............. H04L 63/062
                                                             380/283
2016/0320469 A1    11/2016 Laifenfeld et al.
(Continued)

*Primary Examiner* — Fred A Casca
(74) *Attorney, Agent, or Firm* — Frank Lollo; Brooks Kushman P.C.

(57) ABSTRACT

A system includes a processor configured to detect a vehicle wireless signal at a first frequency-band. The processor is also configured to choose a second signal at a second frequency-band having a predefined relationship to a requested action. The processor is further configured to connect to the second signal and lower a signal data-transfer rate, responsive to the detection, and use the second signal to perform a time-of-flight based user-proximity detection, to determine if a user is within a vehicle proximity range associated with the requested action.

5 Claims, 4 Drawing Sheets

(51) Int. Cl.
*H04W 76/10* (2018.01)
*H04W 4/80* (2018.01)
*H04B 7/0452* (2017.01)
*B64C 39/02* (2006.01)

(56) References Cited

U.S. PATENT DOCUMENTS

2017/0018128 A1    1/2017  Berezin et al.
2017/0214120 A1*   7/2017  Lee ..................... H01Q 1/2291
2017/0344001 A1*  11/2017  Mukai ................... B62D 15/02
2018/0009416 A1*   1/2018  Maiwand ........... G07C 9/00182

* cited by examiner

METHOD AND APPARATUS FOR PHONE AS A KEY INCLUDING DYNAMIC WIRELESS BAND SWITCHING

TECHNICAL FIELD

The illustrative embodiments generally relate to methods and apparatuses for phone as a key including dynamic wireless band switching.

BACKGROUND

Increasingly, customers are interested in using their mobile phone as the key to the vehicle. In the near term, Phone-as-a-Key (PaaK) systems will likely employ BLE technology exclusively to detect and localize portable devices since BLE is widely available on portable devices and is ultra-low power.

A modern practical device localization method involves determining distance by measuring RSSI. However, determining distance via RSSI at the frequency of BLE (i.e. 2.4 GHz) presents several challenges, the most significant of which is multipath fading. A relative immunity to multipath fading can be achieved by using other measurements.

SUMMARY

In a first illustrative embodiment, a system includes a processor configured to detect a vehicle wireless signal at a first frequency-band. The processor is also configured to choose a second signal at a second frequency-band having a predefined relationship to a requested action. The processor is further configured to connect to the second signal and lower a signal data-transfer rate, responsive to the detection, and use the second signal to perform a time-of-flight based user-proximity detection, to determine if a user is within a vehicle proximity range associated with the requested action.

In a second illustrative embodiment, a system includes a mobile-device processor configured to receive a request defining an action having both a proximity verification component, defining an acceptable user-distance from a vehicle for performing the action, and an acceptable proximity error-tolerance. The processor is also configured to determine a frequency band, from a plurality of available vehicle-originating frequency bands, usable to perform a time-of-flight proximity determination having an error margin within the error-tolerance. The processor is further configured to connect to the determined frequency band, lower a data-transfer rate associated with the determined frequency band, and following the lowering, use the determined frequency band to perform the time-of-flight proximity determination in support of the requested action.

In a third illustrative embodiment, a computer-implemented method includes choosing a frequency band from a plurality of detected vehicle-originating frequency bands, having a known time-of-flight distance-measurement error-margin within an error-tolerance pre-associated with the action, responsive to a vehicle-action requested at a mobile device. The method also includes connecting the mobile device and a vehicle over the frequency band and lowering a data-transfer rate associated with the frequency band. The method further includes measuring mobile-device to vehicle distance via signal time-of-flight, in support of the requested action, subsequent to the lowering.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
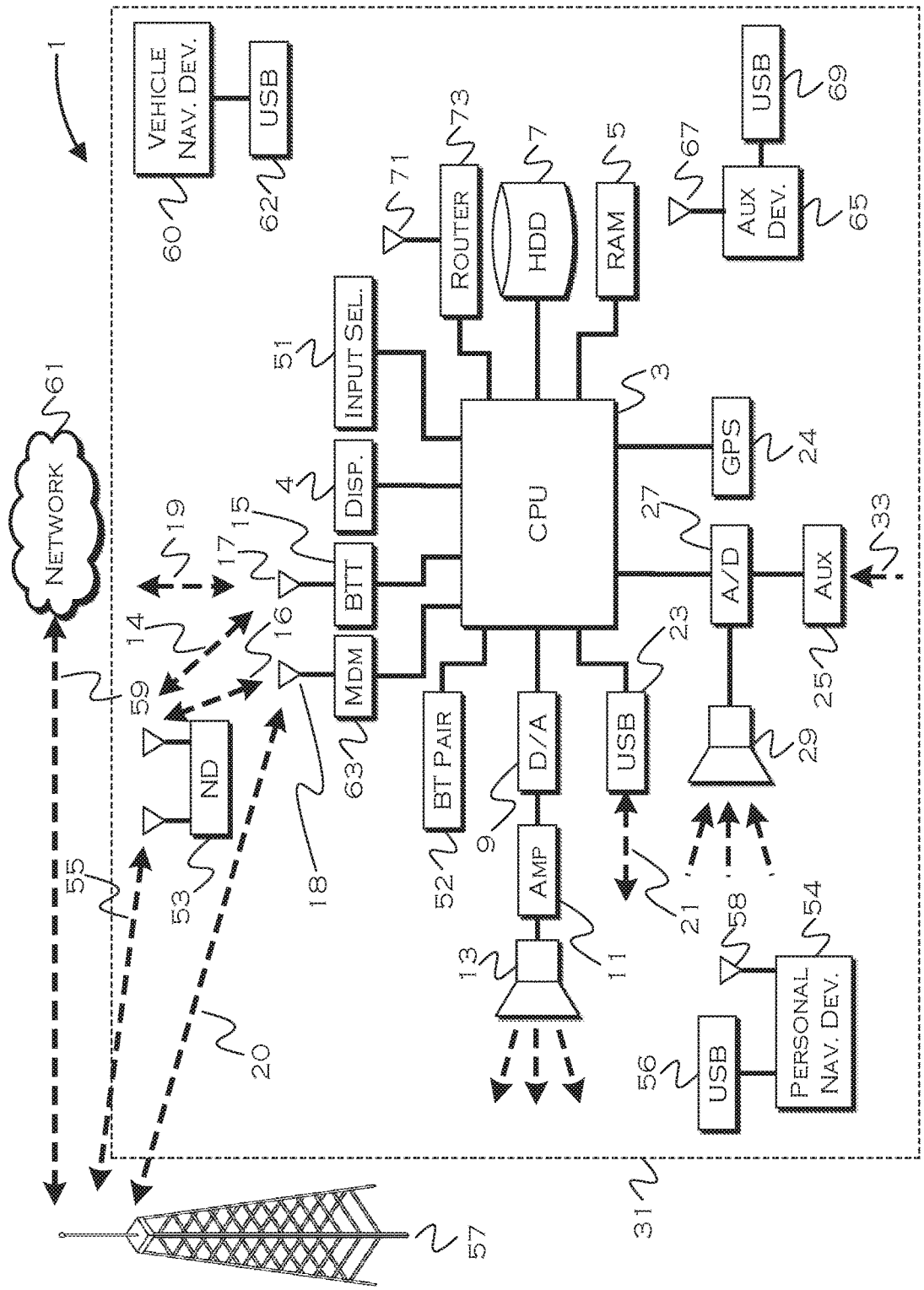
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The most practical phone localization method today involves determining distance by measuring received signal strength indicator (RSSI). However, determining distance via RSSI at the frequency of BLUETOOTH LOW ENERGY (BLE) (i.e. 2.4 GHz) presents several challenges, the most significant of which is multipath fading. A relative immunity to multipath fading can be achieved by measuring distance via time of flight. With time of flight measurements, one can employ a dynamically adjustable threshold, which is not possible with RSSI measurements.

Time of flight can be measured over BLE or Wi-Fi, though time of flight over Wi-Fi is much more precise. This is because the precision of time of flight depends on the amount of bandwidth available and Wi-Fi has much more bandwidth available than BLE (2160 MHz vs 2 MHz). The downside to Wi-Fi time of flight is that existing Wi-Fi (802.11b/g/n at 2.4 GHz and 802.11a/ac at 5 GHz) and Wi-Gig (802.11ad @ 60 GHz) consume much more power than BLE. However, there is an upcoming ultra-low power Wi-Fi technology called Wi-Fi HaLow (802.11ah at 900 MHz) that should match BLE in terms of power.

The localization performance of BLE-based Phone-as-a-Key (PaaK) systems could be improved if Wi-Fi time of flight capability were also incorporated into the PaaK system. However, adding Wi-Fi to a BLE PaaK system would add cost and complexity. A Wi-Fi-only PaaK system would be cheaper and simpler than a Wi-Fi+BLE PaaK system, but may also consume much more power.

The illustrative embodiments propose a Wi-Fi-only PaaK system that switches between Wi-Fi bands (900 MHz, 2.4 GHz, 5 GHz, and 60 GHz) depending on the function needed, among other things. Wi-Fi time of flight may be employed in the 2.4 GHz, 5 GHz, and 60 GHz bands. Additionally, the illustrative systems may employ techniques to reduce the power consumption of existing Wi-Fi (i.e. 2.4 and 5 GHz) technology. In this way, superior localization performance to BLE-only PaaK systems may be achieved while power consumption may be kept at a reasonable level.

Tri-band (2.4 GHz, 5 GHz, and 60 GHz) Wi-Fi access points are available on the market and it is not unreasonable to assume that quad-band (900 MHz, 2.4 GHz, 5 GHz, and 60 GHz) devices will be available in the future. Tri-band access points allow for "band-steering", which means that they present one Wi-Fi network SSID for clients to connect to and then determine which band to use based on factors like signal strength, compatibility, etc. Similarly, we propose a Wi-Fi-only PaaK system that performs band switching, with the exception that not all bands may be active at the same time and that band switching can be based primarily on vehicle function (e.g. remote keyless entry (RKE)).

Since 900 MHz Wi-Fi is designed to be ultra low power similar to BLE, one model includes this band always being active. 900 MHz Wi-Fi can be the default band for connections between phones and the vehicle. This band also allows for maximum RKE range (longer than BLE) and allows for low power communication to other systems (e.g. tire pressure management systems (TPMS)) in the vehicle.

For vehicles that do not currently provide approach detection/welcome lighting, the phone and the vehicle may use 900 MHz Wi-Fi exclusively until a passive entry passive start (PEPS) or remote park assist (RePA) tethering event is required, at which point the connection would switch to 5 GHz or 60 GHz, depending on availability and performance targets. When one phone switches from 900 MHz to another band, 900 MHz on the vehicle may still be available for other phone-to-vehicle connections. For vehicles that provide approach detection/welcome lighting, the PaaK system may also use either 2.4 or 5 GHz Wi-Fi in order to localize the phone relative to the vehicle. This means that in these models either 2.4 GHz or 5 GHz could always be available, or that these frequencies could be made available based on coarse distance as determined by signal strength of the 900 MHz connection.

As mentioned previously, there are methods of reducing the power consumption of Wi-Fi at 2.4 GHz and 5 GHz bands when a high data rate is not actually needed, as could be the case for Phone-as-a-Key. For example, the radio on time could be reduced, the output power could be reduced, and the modulation scheme could be changed to prioritize range over throughput.

For PEPS functions, the PaaK system could employ either 5 GHz or 60 GHz Wi-Fi, depending on availability and performance targets. The switch to 5 GHz or 60 GHz Wi-Fi from 900 MHz or 2.4 GHz could be prompted by the user activating the capacitive sensor on the door handle or by pressing the start button.

RePA tethering requires very precise distance measurement in order to meet government regulation while, at the same time, providing customers enough space to complete their park maneuver. In this situation, 60 GHz Wi-Fi is useful as it has the highest bandwidth and offers the greatest time of flight/distance measurement precision. However, 5 GHz can also be used if longer range is needed and lower precision is acceptable. The switch to the 5 GHz or 60 GHz band could be prompted by the user beginning the RePA event from their phone.

The illustrative embodiments use phones and Wi-Fi chips in vehicle that are able to perform Wi-Fi time of flight. This likely means that these devices are certified to the Wi-Fi Location protocol by the Wi-Fi Alliance. This protocol/certification enables devices to accurately measure time of flight with good interoperability.

For scenarios that typically require high-power/high-precision frequencies, the illustrative embodiments propose the use of a method to reduce power consumption over long-term use in consistent areas. This method is based on the fact that different environmental conditions impose different amounts of error on time-of-flight systems. For example, Line of Sight (LOS) conditions generally impose less error than Non-Line of Sight (NLOS) conditions due to a lack of interference in the former.

The method also assumes that in a given location (such as a home garage, school/work parking deck, grocery store parking lot, etc.), the environmental conditions will be somewhat consistent over time.

Precise time of flight measurement requires wide bandwidth signals because wide bandwidth signals allow for shorter signal pulses and shorter signal pulses allow for easier detection of the start and end of a signal in the presence of noise.

See the table below for a list of RF technologies, the frequency bands supported by these technologies, and the bandwidth available at these frequencies. This table also includes an estimate of the best achievable distance error for time of flight measurements at these frequencies. In general, the wider the bandwidth available, the lower the time of flight distance error (or, the better the time of flight distance precision). These estimates are based on information from members of the Wi-Fi Alliance Task Group on Wi-Fi Location, and from the various technology suppliers.

| RF Technology | Frequency Band (GHz) | Bandwidth (MHz) | Best time of flight distance error (m) |
|---|---|---|---|
| Bluetooth Low Energy (BLE) | 2.4 | 2 | 7 |
| Wi-Fi | 0.9 | 1-16 | ? |
|  | 2.4 | 20-40 | 2.7 |
|  | 5 | 20-160 | 1.2 |
|  | 60 | 2160 | <0.1 |
| Ultra-wideband (UWB) | 3.1-10.6 | >500 | 0.1 |

Figure 3:
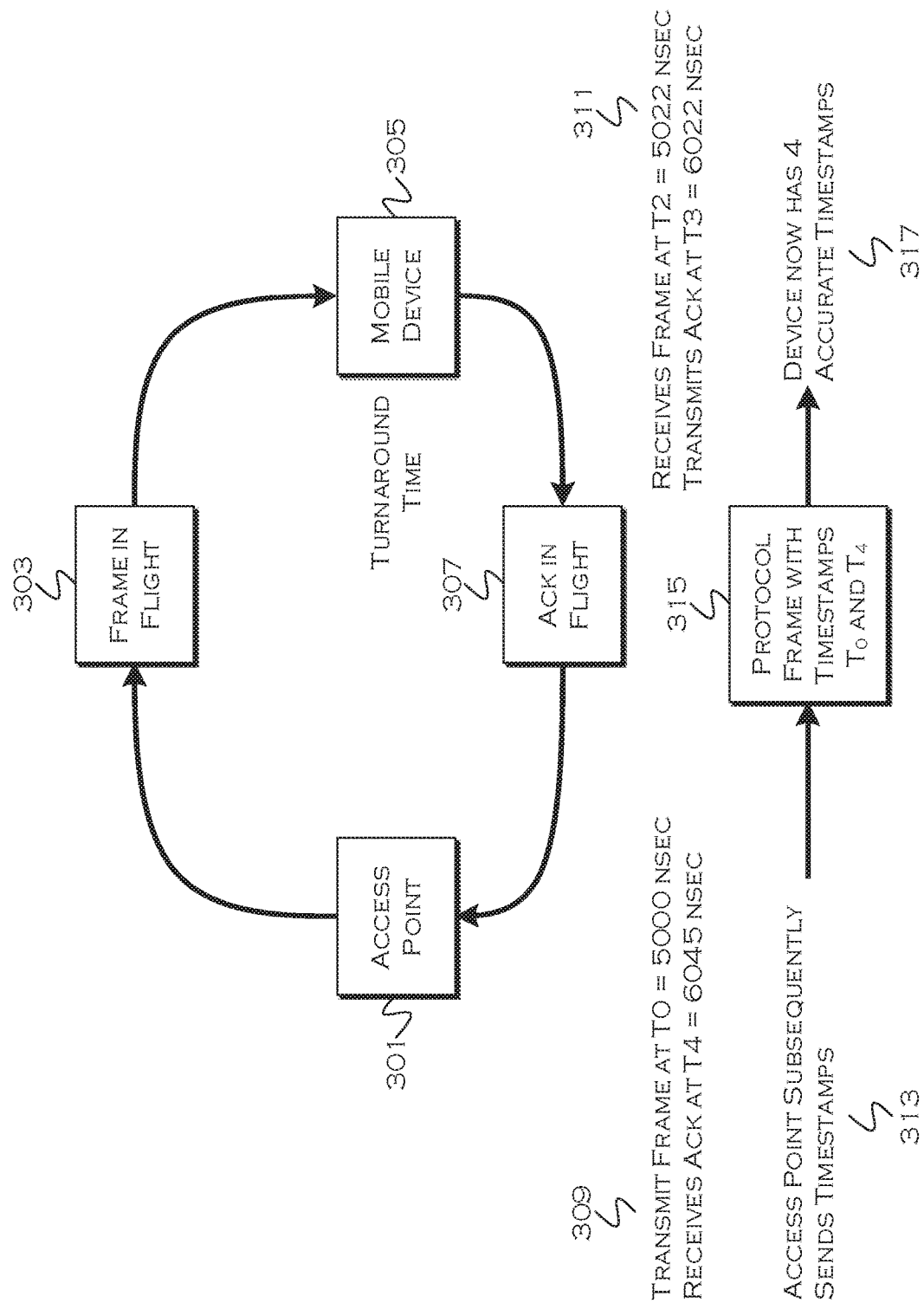
FIG. 3 shows an illustrative example of how RTT may be measured for devices certified to the Wi-Fi Alliance's Wi-Fi Location protocol.

When time of flight is used in this disclosure, it actually refers to round-trip time of flight or simply round-trip time (RTT). FIG. 3 shows an illustrative example of how RTT may be measured for devices certified to the Wi-Fi Alliance's Wi-Fi Location protocol.

The location protocol can use three transmissions: 1) An access point sends a frame, which is received at a mobile device; 2) The mobile device responds with an acknowledgement, which is received at the access point; and 3) The access point sends a frame containing two timestamps (as part of the first frame of a next-measurement).

The distance calculation can be summarized as:

Time of flight=((initial transmit time−receive acknowledgement time)−(transmit acknowledgement time−receive acknowledgement time))/2

Distance=transmit time (in nsec)*0.3 (result is meters of distance, 0.3 m being the distance light travels through air in one nSec)

In the example show in FIG. 3, the mobile device is performing the distance calculation. In a PaaK/RePA system, the roles would likely be reversed i.e. the vehicle will perform the distance calculation.

The primary reason why Wi-Fi consumes more power than BLE, when they both operate at 2.4 GHz, is data rate. Since BLE is not intended for high data rates, the radio on-time for BLE can be significantly reduced as compared to standard Wi-Fi. Additionally, to provide a high data at a reasonable range, the output power of Wi-Fi must be increased. Both of these factors contribute to the power disparity between Wi-Fi and BLE.

Figure 2:
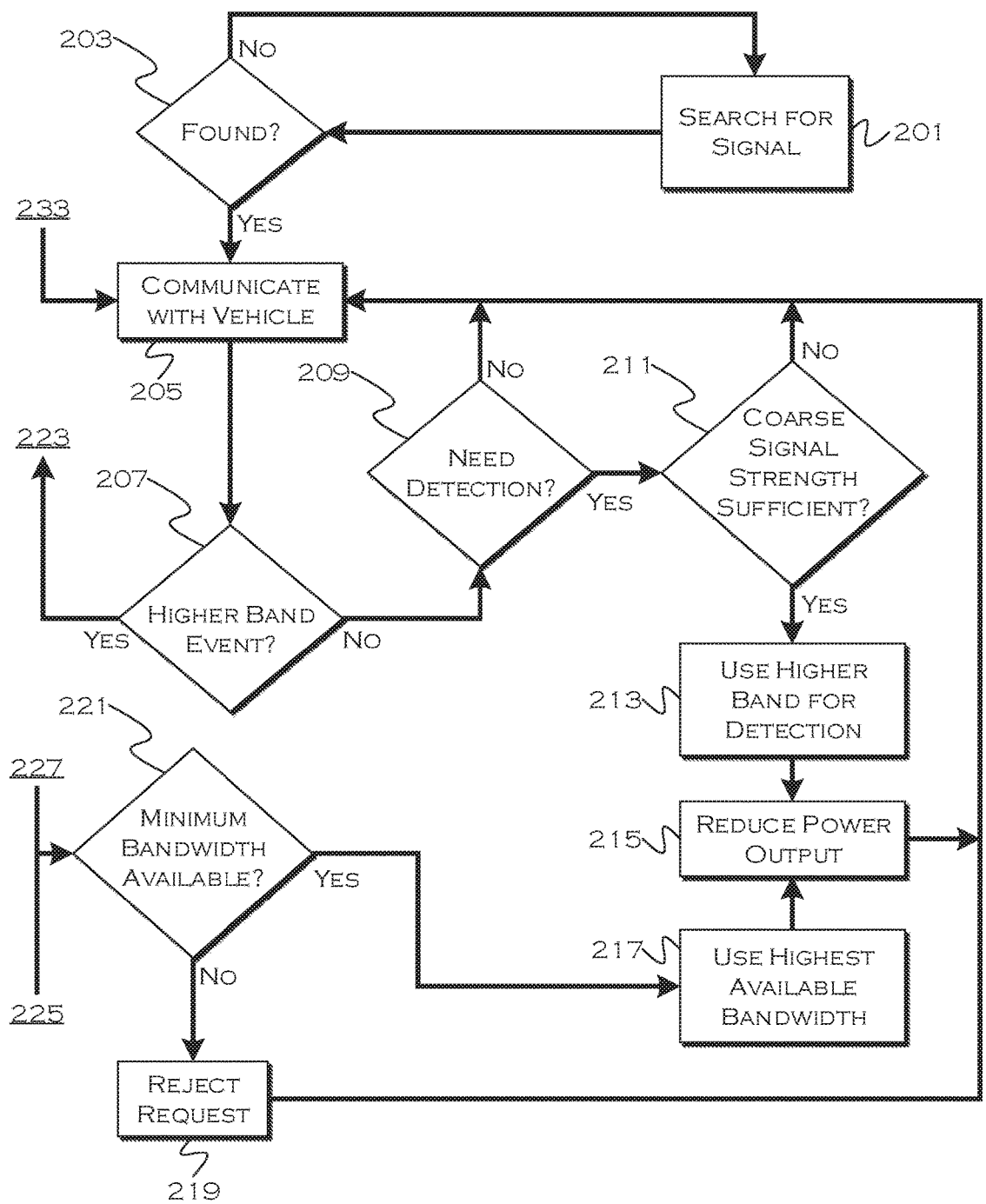
FIG. 2 shows an illustrative process for using multi-band Wi-Fi as support for RKE and PEPS functions while lowering typical power requirements for Wi-Fi.
Figure 2:
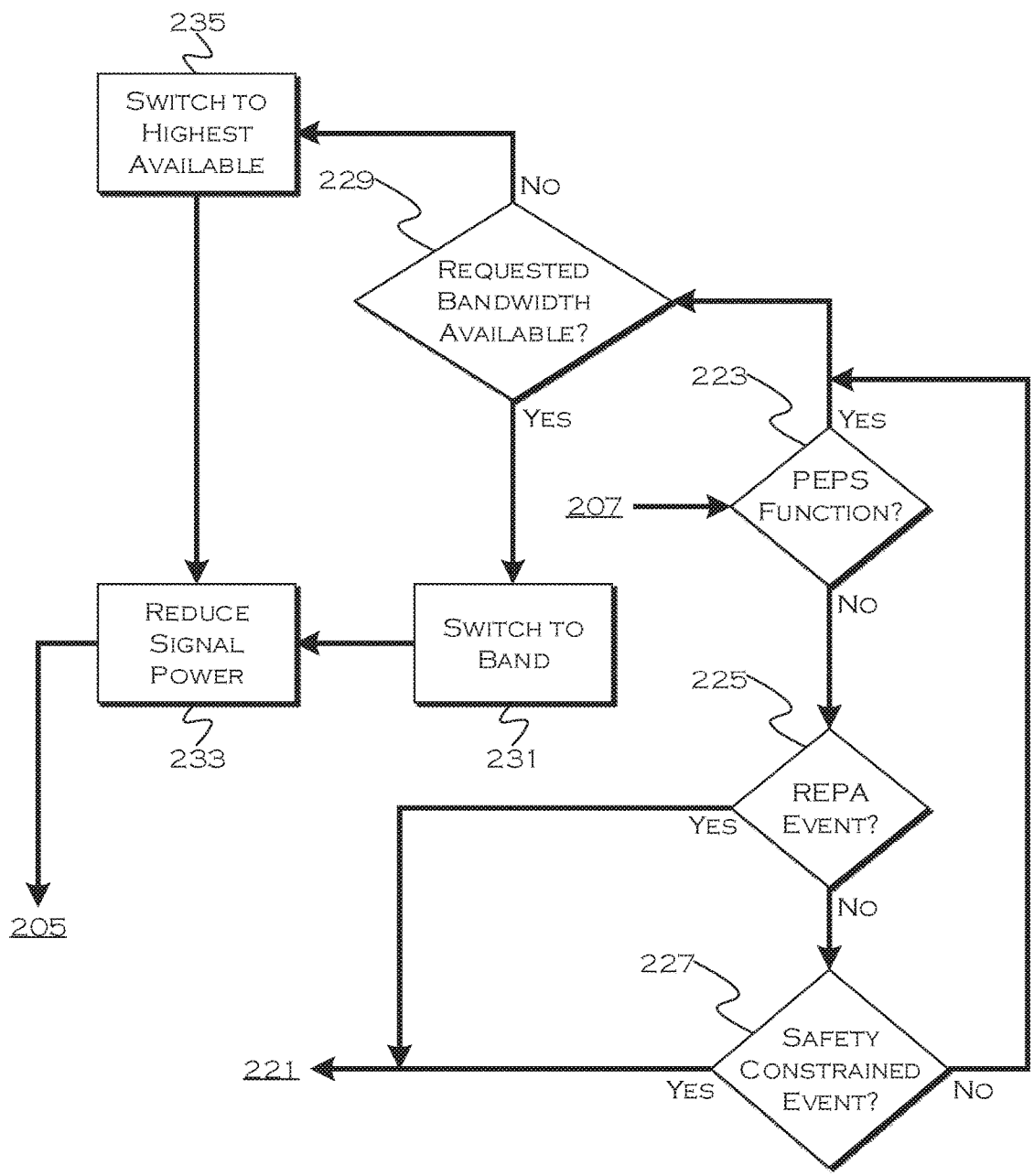

FIG. 2 shows an illustrative process for using multi-band Wi-Fi as support for RKE and PEPS functions while lowering typical power requirements for Wi-Fi.

In this illustrative example, the process searches 201 for any available Wi-Fi signal. Since different vehicles may provide different "passive" detection signals, based on services provided (e.g., approach lighting), the process can scan certain frequency bands or an entire set of frequency bands for an initial signal detection. Once a signal is found 203, the process can use the detected frequency band to communicate 205 with the vehicle.

This process covers a series of potential next-actions, which encompass the high-band and lower band events previously discussed, among other things. If the desired user-initiated or automatic event is a not a high-band event (i.e., functions like PEPS or RePA have not yet been requested), the process will then determine if proximity detection (user to/approaching vehicle) is required 209. That is, was the approach lighting the next requested process or even available?

If the model includes some form of approach support, the process may also determine 211 if the coarse signal strength currently provided by, for example, a 900 MHz signal is sufficient to support the detection needed. If the coarse signal strength is insufficient, the process can switch 213 to a higher frequency band, such as 2.4 or 5 GHz, which provides a more accurate time-of-flight measurement.

Since those frequency bands natively consume more power, when such a switch is made, the process may also reduce 215 the power output associated with the new frequency band, which can involve, for example, forcing a lower data rate since the purpose of the current use of the signal is not to transmit a high volume of data, but rather to measure time of flight. After performing the services (if any) related to approach support, by using a higher frequency band with a lower power usage, for example, the process can return to communicating with a vehicle (through an always-on connection, for example, such as 900 MHz).

If the current function requested is a "higher-band" function, such as PEPS 223, which may require a 5 or 60 GHz Wi-Fi connection, the process may determine 229 if the requested frequency band is currently available. If the preferred frequency is not available, the process may select 235 the highest available frequency band (to minimize proximity error). If a sufficiently error-minimized frequency band is not available, the process may impose some additional restrictions, such as limiting a detection zone approved for PEPS request handling, to mitigate errors at the available frequency. Otherwise, the process may select 231 the intended usable frequency band for the PEPS function. In both instances, the process may again lower 233 the power usage by the requested frequency band, as high-data transfer rates are not necessarily required.

By using the higher frequency band for PEPS functions, the system can have better assurances that the user is actually where the user is expected to be, before providing the entry/start function, since the proximity detection error is much lower at these wideband high frequencies. At the same time, the power usage of these frequencies can be managed to preserve as much power as possible.

So, for example, in a 4 band system, the 900 MHz signal may be always-on. As a user approaches the vehicle, a user mobile device (e.g., phone, watch, etc) may detect the 900 MHz signal and use the signal to communicate with the vehicle. The first function request may be automatic approach lighting, and the process may switch to a 5 GHz signal, but lower the power output, to precisely enable approach lighting. Once that request is fulfilled, the process may receive a PEPS entry request, which uses an available 60 GHz signal, again, at a lowered power output (lowered data rate, for example). The PEPS entry request and a PEPS start request may be fulfilled based on proximity detection through the low-power high-frequency Wi-Fi signal.

If the request involves a RePA event 225, or another safety-constrained event 227, which has a minimum precision requirement, the process may check 221 to see if a specified minimum frequency is available. That is, is there a frequency band for which the known precision will allow for request-fulfilment? If this frequency band is not available (not provided or not available for another reason), the process may reject 219 the request. If there is at least sufficient minimum frequency band 221 to fulfill the request within required safety standards (e.g., sufficiently low degree of error), the process will use 217 the highest available of available frequencies, which should minimize the error. Again, the process can also force 215 a lower power consumption over the new frequency band by lowering the data transfer rate.

If the "other" event is not safety constrained, the process moves to the PEPS model, whereby the process attempts to find a preferred frequency band, and if not available, the most precise available frequency band is used (unless otherwise constrained).

The illustrative embodiments allow for a varied precision model of proximity detection based on wireless time-of-flight, that avoids the multipath fading downside to RSSI models while avoiding power consumption downsides to Wi-Fi based models.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   detect a vehicle wireless signal at a first frequency-band;
   choose a second signal at a second frequency-band having a predefined relationship to an automatic action, based on user approach, wherein the second frequency-band is predefined as any frequency-band above 2.4 GHz, unless a coarse signal strength of the vehicle wireless signal is above a predefined threshold, in which case the second frequency-band is defined as a same frequency-band as the first frequency-band;
   responsive to the detection, connect to the second signal and lower a signal data-transfer rate; and
   use the second signal to perform a time-of-flight based user-proximity detection, to determine if a user is within a vehicle proximity range associated with the automatic action.

2. The system of claim 1, wherein the first frequency-range band is 900 MHz.

3. The system of claim 1, wherein the requested action is a passive entry passive start function.

4. The system of claim 3, wherein the second frequency-band is predefined as any frequency-band above 5 GHz.

5. The system of claim 1, wherein the automatic action is an action having a predefined safety standard, defining a proximity error tolerance acceptable for handling the requested action.

* * * * *